Oct. 20, 1931. J. C. TRAVILLA, JR 1,828,003
LOCOMOTIVE SPRING EQUALIZING SYSTEM
Filed March 6, 1931
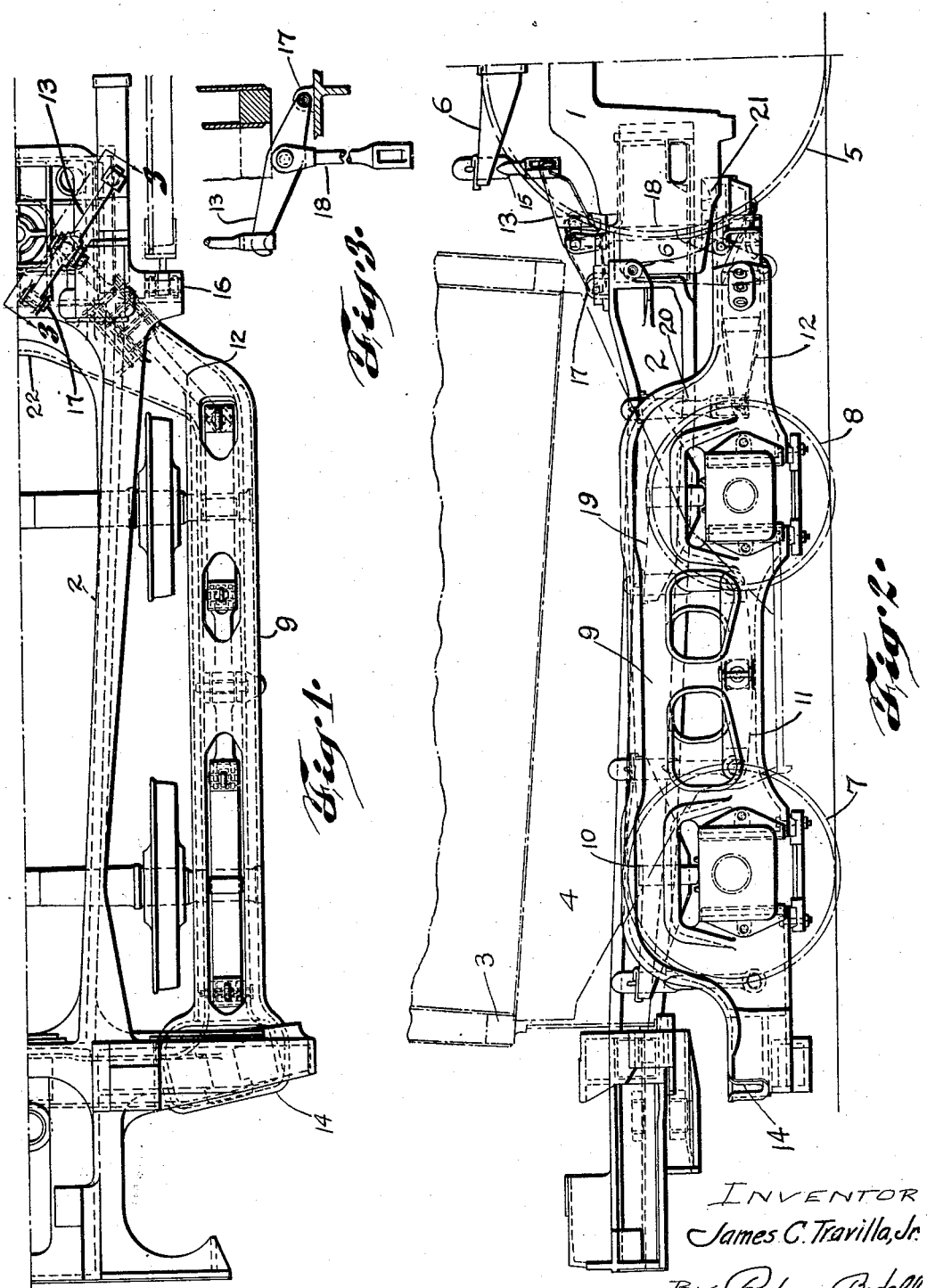

Patented Oct. 20, 1931

1,828,003

UNITED STATES PATENT OFFICE

JAMES C. TRAVILLA, JR., OF PHILADELPHIA, PENNSYLVANIA, ASSIGNOR TO GENERAL STEEL CASTINGS CORPORATION, OF GRANITE CITY, ILLINOIS, A CORPORATION OF DELAWARE

LOCOMOTIVE SPRING EQUALIZING SYSTEM

Application filed March 6, 1931. Serial No. 520,526.

My invention relates to railway rolling stock and consists in a novel equalizer arrangement for connecting sets of wheel supported springs where the superstructure is mounted on two or more sets of wheels. A familiar example of such structure is found in locomotives where the axles of the trailing truck under the rear end of the locomotive are provided with one spring system and another spring system is provided for the driver axles under the main frame. Various arrangements for effecting equalization of the two spring systems are described in Patents Nos. 1,703,525 and 1,703,526 issued to E. G. Hallquist on February 26, 1929.

It is usually desirable to locate the trailing truck springs outside of the wheel gauge to accommodate the firebox, whereas the main driver springs are usually inside the wheel gauge. Hence, equalizers directly connecting the truck and main spring systems must extend diagonally and frequently are located too close to the rear driver to properly clear the brake rigging. The Hallquist patents meet this situation by hanging a longitudinal bar from the rear end of the rear driver spring and from a bracket located either on the truck frame or the main frame cradle directly behind the main driver spring, and supporting the front end of the equalizer from the intermediate portion of this bar.

Hallquist Patent 1,703,526. Figures 4 and 5, discloses a structure in which the front end of the longitudinal bar is connected to the rear end of the rear driver spring by means of a vertical hanger instead of being suspended from the driver spring through an additional transverse bar or equalizer such as is shown in the other disclosures of the patent. The longitudinal bar extends rearwardly in line with the driver spring and is located within a hollow portion of the locomotive side frame between the cradle and main frame portions thereof. However, in built-up underframes this portion is usually occupied by bolting elements which would interfere with the longitudinal bar in this position.

One of the objects of the present invention is to provide an equalizing arrangement in which the transverse bar or equalizer is eliminated but which can be applied to a locomotive frame structure in which the cradle is separate and is bolted to the locomotive main frame.

Another object of the present invention is to provide equalizing members which will clear both the brake rigging and the firebox foundation ring for locomotives having the usual clearance conditions between mud ring and frame and between brake rigging and front trailer wheel. Other objects are to reduce the number of parts required to complete the equalizing arrangement and to reduce the weight of the equalizing structure and to reduce the attention required for frequent inspection and maintenance.

I attain these objects and others substantially by mounting a bar diagonally between a link depending from the rear end of the rear driver spring and a bracket projecting from a point on the cradle cross member immediately at the rear of the drivers but nearer the center line of the locomotive and then suspending an equalizer, pivotally supporting the trailing truck, from this bar and the front truck spring.

I illustrate a selected embodiment of my invention in the accompanying drawings in which—

Figure 1 is a top view of a longitudinal half of a locomotive cradle and trailing truck.

Figure 2 is a side view of the same.

Figure 3 is a detail elevation of the diagonal bar taken on the line 3—3 of Figure 1.

The locomotive main frame is indicated at 1 and is provided with a rear extension or cradle 2 which carries the firebox structure including mud ring 3 and ashpan 4. Brake hanger brackets 16 are formed integral with the cradle near the intersection of cradle and main frame and adjacent to the rear drivers 5. The drivers support the main frame 1 in the usual manner by a series of interconnecting springs 6 forming a main equalizing system. The trailer truck wheels 7 and 8 support the truck frame wheel pieces 9 through springs 10 and 19 which are equalized with each other by the lever 11 and are equalized with the main frame spring system by levers 12 and 13, the arrangement of which, together with associated parts, constitutes my present invention. The cradle 2 is supported on the rear end of the trailer truck through the usual arrangement of rockers (not shown) seated in the pocket 14.

The rear end of driver spring 6 carries link 15 which supports the forward end of lever 13 disposed diagonally of the locomotive center line and fulcrumed at 17 on lugs preferably formed integral with the cradle 2.

Link 18 is suspended from lever 13 intermediate the ends of the latter and supports the forward end of the lever 12. The other end of lever 12 is carried by the front end of the truck spring 19 through a link 20 and lever 12 is fulcrumed between its ends to the transverse front member 22 of the truck frame, thereby supporting the latter.

The above described arrangement eliminates the use of cross equalizers extending between the rear driver springs and cross equalizers extending between the front truck springs. The equalizer connections are moved away from the brake rigging and from the firebox, which obviously facilitates their assembly and operation. The location of the fulcrum 17 for lever 13 near to the center plate structure 21 through which the locomotive main frame and cradle are supported reduces the stress in the cradle. This makes possible a reduction in the weight of the adjacent cradle structure and the pattern work is simplified where the cradle is cast.

It will be understood that the location of the lug 17 on the cradle may be varied and the equalizing levers 12 and 13 may be disposed at any suitable angle to each other, as long as the lever 13 clears the firebox foundation ring 3 and the equalizer 12 does not interfere with the brake rigging adjoining the rear driver. Obviously, various other details of construction may be varied without departing from the spirit of my invention and I contemplate the exclusive use of all such variations as come within the scope of my claims.

I claim—

1. In a locomotive, a main frame, a supporting spring therefor, a lever supported at one end from said spring and extending diagonally inwardly and rearwardly of said spring to a fulcrum point on said frame, a truck frame, a supporting spring therefor, and a truck frame supporting equalizer carried by said truck spring and said lever at a point on the latter between its fulcrum and its support.

2. In a locomotive, a main frame, a supporting spring therefor, a truck frame, a supporting spring therefor, a diagonal lever supported at its respective ends from one of said frames and from the spring supporting that frame, and a truck supporting equalizer supported at its respective ends from the other of said springs and from said lever.

3. In a locomotive, a main frame, a supporting spring therefor, a truck frame, a supporting spring therefor, a diagonal lever supported at its respective ends from a transverse element on said main frame and from said main frame supporting spring, and an equalizer pivotally supporting said truck frame and suspended at one end from said truck frame supporting spring and at its other end from said lever.

4. In a locomotive, a main frame, a supporting spring therefor, a truck frame, a supporting spring therefor, a firebox positioned substantially above said truck frame, a lever extending diagonally of said main frame and supported at its respective ends from said main frame and from said main frame spring, and a truck supporting equalizer supported at its respective ends from said truck spring and said lever, said lever being arranged to avoid said firebox throughout its length.

5. In a locomotive, driving wheels, a main frame comprising side portions and a transverse member between the rear ends of said portions, a spring supporting said frame from said wheels, a brake hanger on said frame adjacent said transverse member, a brake hung from said hanger and adapted to be applied to the rearmost one of said wheels, a truck frame comprising side members and a transverse member connecting the forward ends of said members, a supporting spring for said truck, a firebox supported by said main frame and positioned substantially above said truck frame transverse member, a diagonal lever supported from said main frame spring and a point on said main frame transverse member spaced from said firebox, and a truck supporting equalizer supported from said truck spring and said lever and spaced throughout its length from said driver brake.

6. In a locomotive, a main frame including a cradle, a driving wheel, a spring supporting said frame from said wheel, a truck frame, a supporting spring therefor, a firebox supported by said cradle and extending over the front end of said truck frame, and a compound equalizing connection between said main frame spring and said truck spring comprising a bar extending rearwardly and inwardly from said main frame spring to a fulcrum point on said main frame and an equalizer extending diagonally of said bar, said bar and said equalizer being spaced from said firebox.

7. In a locomotive, a frame comprising a portion abreast of the drivers and a separate cradle secured to said portion, a supporting spring for said frame, a truck frame, a supporting spring therefor, a diagonal lever supported at its respective ends from one of said frames and from the spring supporting that frame, and a truck supporting equalizer supported at its respective ends from the other of said springs and from said lever.

In testimony whereof I hereunto affix my signature this 27th day of February, 1931.

JAMES C. TRAVILLA, Jr.